United States Patent [19]

Choi

[11] Patent Number: 5,573,197
[45] Date of Patent: Nov. 12, 1996

[54] REEL DISC DRIVING DEVICE FOR A VIDEO CASSETTE RECORDER

[75] Inventor: Yoo-Kil Choi, Incheon, Rep. of Korea

[73] Assignee: Ltd. Daewoo Electronics Co, Seoul, Rep. of Korea

[21] Appl. No.: 365,725

[22] Filed: Dec. 28, 1994

[30] Foreign Application Priority Data

Dec. 30, 1993 [KR] Rep. of Korea ............ 93-31704

[51] Int. Cl.$^6$ .................. G11B 15/32; G03B 1/04
[52] U.S. Cl. ................... 242/356.6; 360/96.3
[58] Field of Search ............... 242/356.6, 356, 242/356.7; 360/96.3

[56] References Cited

U.S. PATENT DOCUMENTS 4,173,320  11/1979  Schatteman .......... 242/356.6 X

Primary Examiner—John Q. Nguyen
Attorney, Agent, or Firm—Anderson, Kill, Olick P.C.

[57] ABSTRACT

A reel disc driving device for a video cassette recorder comprises a clutch wheel disposed between a driving pulley and a driving gear, which can directly transmit the driving force of the pulley to the gear depending on the selection of operating mode. Mounted to a cylindrical hub of the pulley is a torque generating mechanism which can produce variably a torque required for driving the gear. The variable torque generating mechanism includes a pair of one-way clutch springs coupled to the hub of the pulley and the gear, resepectively, which is actuated in an opposite relationship with each other so that the torque is variably adjusted upon the switching of selected operating mode, maintaining constantly the rotating torque of the gear for each of the operating modes.

4 Claims, 3 Drawing Sheets

REEL DISC DRIVING DEVICE FOR A VIDEO CASSETTE RECORDER

FIELD OF THE INVENTION

The present invention relates to a reel disc driving mechanism; and, more particularly, to a device for driving reel discs of a video cassette recorder ("VCR"), capable of maintaining a constant rotating torque thereof even during an extended use of the VCR over a long period.

DESCRIPTION OF THE PRIOR ART

As is well known, a VCR includes a supply and a take-up reel discs. The rotating torque of each reel disc need be varied to allow the VCR to be operable in a different selected mode, e.g., play mode, review mode, rewinding mode, fast forward mode, through the selective operation of the driving mechanism thereof.

A typical reel disc driving system of the VCR is schematically shown in FIG. 1, wherein a tape T may be made to travel in a normal or a reverse direction by the selective drive of a supply reel disc SR or a take-up reel disc TR. Further, the tape T can be made to travel at a constant speed by means of a capstan shaft CS and a pinch roller PR. In general, such selective drive of the reel discs can be achieved by using an idler ID for transmitting the driving force of a capstan motor CM. If the idler ID is shifted clockwise or counterclockwise by rotating the capstan motor CM in the normal (clockwise) or the reverse direction (counterclockwise), the reel discs TR(normal or clockwise direction), SR(reverse or counterclockwise direction) are rotated accordingly. However, looseness of a loaded magnetic tape may occur during the conversion from one mode to another mode of operation due to a delay in the shifting motion of the idler and an inertia moment of the reel discs, which may cause operational failures, noises and/or distortions. In this regard, the take-up reel disc TR requires a relatively lesser torque in running the tape T in a normal direction because it is disposed closer to the capstan motor CM, whereas the supply reel disc SR requires a relatively larger torque in moving the tape T in a reverse direction as it is farther removed from the capstan motor CM. Moreover, in case of the rewinding or fast forward operating mode wherein the tape is run in a higher speed, a higher level of torque is required for rotating the reel discs. Such requirements for varying the rotating torque of each reel disc are normally met or executed by means of a reel disc driving mechanism.

FIG. 2 shows an exemplary prior art reel disc driving mechanism of a VCR. The reel disc driving mechanism as depicted comprises a first rotator 12 rotatably mounted to a support shaft 14 which is secured to a deck 16, a driving pulley 18 rotatably inserted around a hub 13 of the first rotator 12 and frictionally contacted with the first rotator 12 through a felt member 34, and a second rotator 22 firmly fitted on the hub 13 of the first rotator 12. A movable member 20 is coupled to the second rotator 22 so that it is selectively engaged with openings 32 of the driving pulley 18 so as to directly transmit the drive force of the pulley 18 to the second rotator 22. In addition, seated at the second rotator 22 is a spring 24 which can bias the movable member 20 upward to separate it from the openings 32 of the driving pulley 18, thereby transmitting the driving force of the pulley 18 to the first rotator 12 through the felt member 34. A driving gear 10 is rotatably inserted around the hub 13 of the first rotator 12 and meshed with the idler ID. Also, disposed between the second rotator 22 and the driving gear 10 is a spring 26 which urges the gear 10 upward to properly engage it with the idler ID. The pulley 18 is rotated clockwise or counterclockwise through a belt 30 coupled thereto, depending on forward or reverse drive of the capstan motor CM.

In case of play or review mode, the movable member 20 is kept separated from the pulley 18. Therefore, the driving force of the pulley 18 is transmitted to the first rotator 12 due to the frictional contact therebetween via the felt member 34, providing the driving gear 10 with a relatively lesser torque through the second rotator 22 and the spring 26. As a result, the idler ID is shifted toward and engaged with one of the reel discs SR, TR, thereby operating the VCR in a desired mode. When an excessive load is urged against the driving gear 10 during an operation of the VCR, a slippage between the pulley 18 and the first rotator 12 occurs, preventing a loaded tape from slackening.

In a rewinding or fast forward mode operation of the VCR, the movable member 20 is pressed downward against the biasing force of the spring 24 by a pressing member (not shown) and then engaged with the driving pulley 18 through the openings 32 of the pulley 18. Therefore, the pulley 18 and the second rotator 22 are unitarilly rotated together with the first rotator 12. Accordingly, the driving force of the pulley 18 is directly transmitted to the gear 10 to thereby generate a higher torque for each reel disc, enabling the VCR to operate in the rewinding or fast forward operating mode.

However, in a prolonged use of the VCR over a long period, defacement or demage to the felt member 34 may occur, rendering it difficult to generate a required torque for properly driving the reel discs and to constantly maintain the rotating torque of the reel discs. This can cause an irregular running of the tape, especially in view of the fact that the felt member is rather vulnerable to deformations due to susceptibility to temperature and moisture.

SUMMARY OF THE INVENTION

Accordingly, it is an object of the invention to provide a reel disc driving device for use in a VCR, which is capable of producing a constant torque required for driving reel discs during a selected mode operation of the VCR.

It is another object of the invention to provide a reel disc driving device with a torque adjusting mechanism which is designed to vary a rotating torque for a driving pulley and a driving gear thereof, depending on the operating mode selected.

The above and other objects of the present invention are accomplished by providing an improved reel disc driving device for use in a VCR having an idler for selectively transmitting the driving force of a capstan motor therethrough to one of a supply and a take-up reel discs rotatably mounted to a deck of the VCR, which comprises:

a driving pulley having a cylindrical hub rotatably mounted to a support shaft of the deck and a flange extending from a lower part of the hub in a generally perpendicular relationship with each other;

a driving gear having an inner cylinder inserted around an upper part of the hub, an outer cylinder concentrically spaced from the inner cylinder, and a gear portion integrally formed at the outer cylinder and meshed with the idler;

a clutch wheel disposed between the pulley and the gear for a selective engagement with the pulley, the clutch wheel including a ring member axially slidably coupled to the outer cylinder of the gear and an annular web outwardly extended from a lower portion of the ring member;

means for biasing the clutch wheel upward to disengage it from the flange; and means mounted to the hub of the pulley for variably generating a torque required for driving the gear depending on an operating mode selected.

In accordance with a preferred embodiment of the present invention, the torque generating means includes a cylindrical, stepped spring holder having a plurality of slits formed at an upper and a lower portions thereof, a first one-way clutch spring inserted around the inner cylinder of the gear, one end of the first clutch spring being fixed to one of the upper slits and the other end being fixed to the inner cylinder of the gear, and a second one-way clutch spring inserted around the lower part of the hub which has a greater diameter than that of the inner cylinder, one end of the second clutch spring being fixed to one of the lower slits and the other end being fixed to the lower part of the hub, the second spring having a greater diameter than that of the first spring, wherein the respective clutch springs are activated in an opposite relationship with each other in the switching of operating mode, thereby allowing the first one-way clutch spring to bind the inner cylinder of the gear, while allowing the second one-way clutch spring to release the lower part of the hub and vice versa.

Further, the clutch wheel includes a plurality of protrusions downwardly projected from the web thereof, and the pulley includes a plurality of rib members formed on the flange thereof, whereby the protrusions are engaged with the rib members in a downward position of the clutch wheel to directly transmit the driving force of the pulley to the gear through the clutch wheel..The gear includes guide grooves formed at the outer cylinder thereof, and the clutch wheel includes sliders provided in the ring member thereof and slidably engaged with the guide grooves of the gear.

In addition, the hub of the pulley has an annular locking recess formed on the top end thereof, and the inner cylinder of the gear has an annular locking jaw provided at an internal upper portion thereof and adapted to engage with the locking recess.

BRIEF DESCRIPTION OF THE DRAWINGS

The above and other objects, features and advantages of the present invention will become apparent from the following detailed description given in conjunction with the accompanying drawings, in which.

DETAILED DESCRIPTION OF THE PREFERRED EMBODIMENTS

Figure 1:
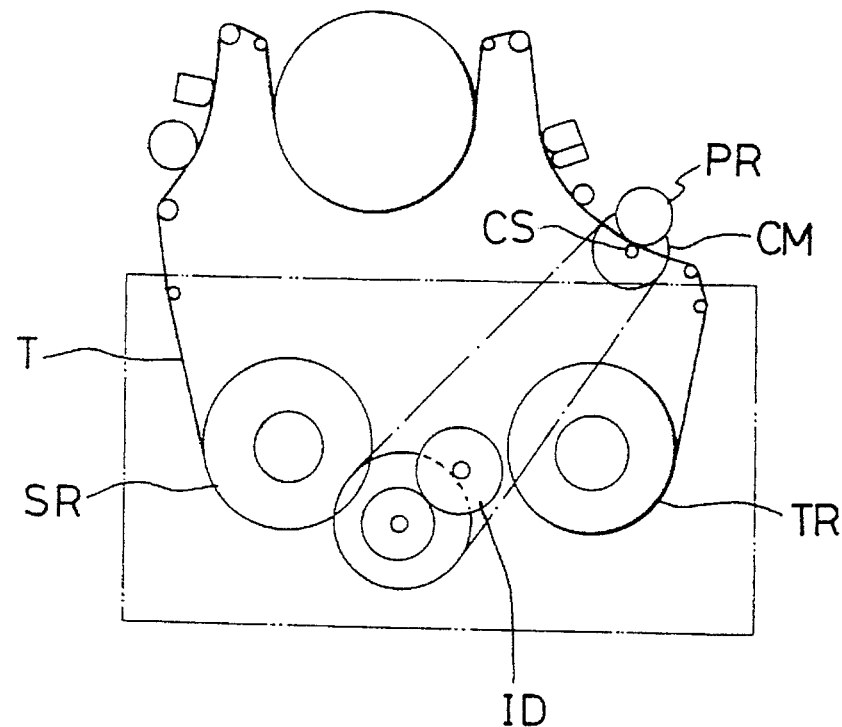
FIG. 1 is a schematic plan view for explaining the operation of a VCR.
Figure 2:
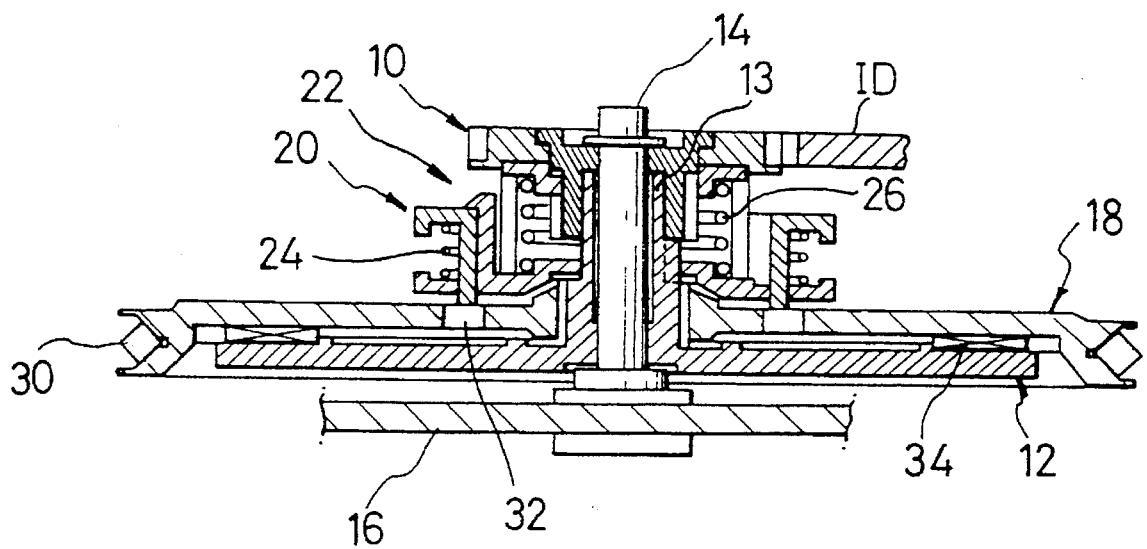
FIG. 2 presents a longitudinal section view of a prior art reel disc driving device.
Figure 3:
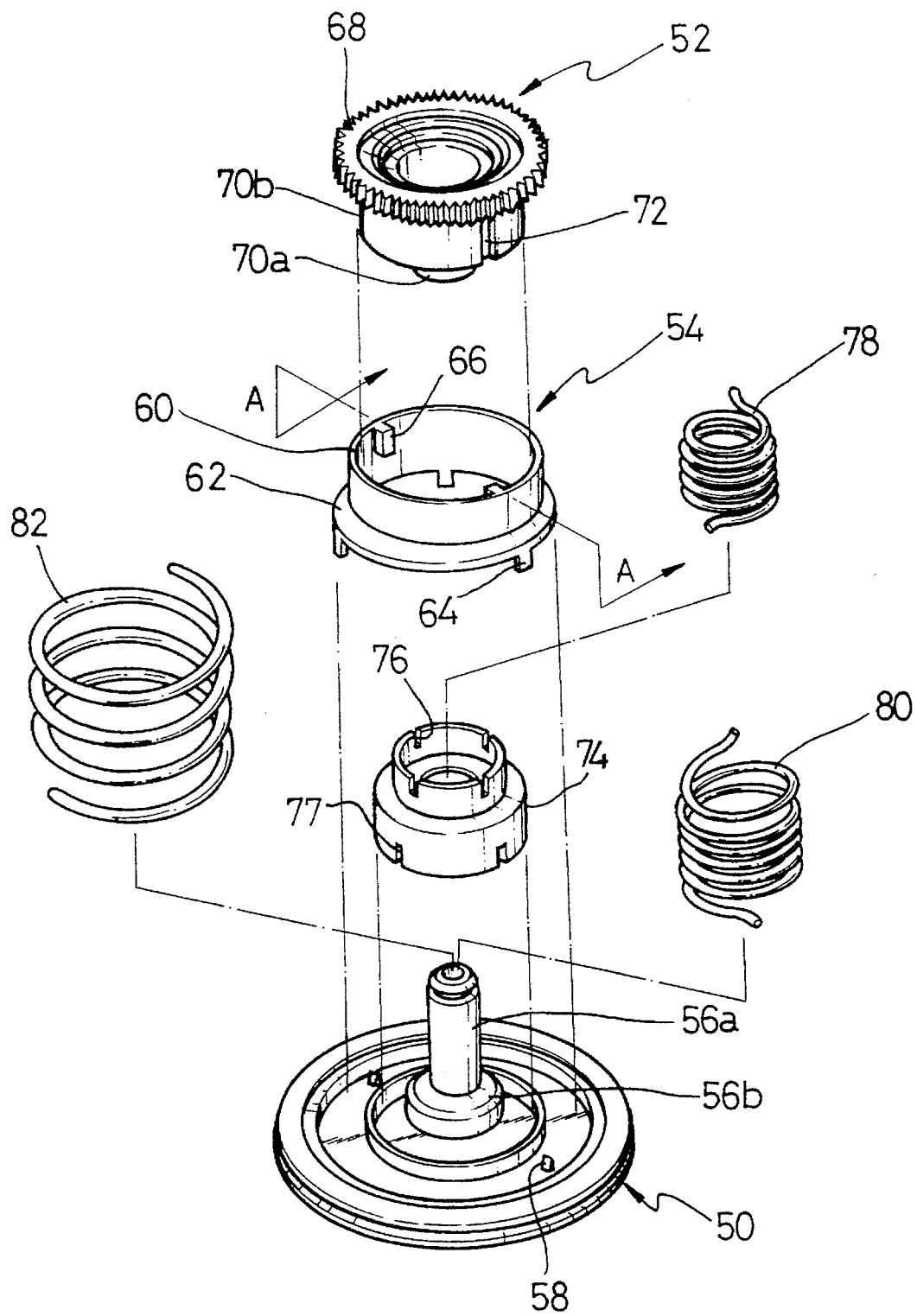
FIG. 3 offers an exploded perspective view of a reel disc driving device in accordance with the present invention.

Referring now to FIG. 3, there is explodedly shown a reel disc driving device for use in a VCR in accordance with a preferred embodiment of the present invention. As shown, the reel disc driving device comprises a driving pulley 50 rotatably mounted to a shaft 88 of a deck(not shown), a driving gear 52 coupled to the driving pulley 50, a clutch wheel 54 movably disposed between the pulley 50 and the gear 52 for selectively interconnecting them, and clutch means provided at the pulley 50 for generating a variable torque.

The pulley 50 includes a cylindrical hub 56a rotatably inserted around the shaft 88, a flange 56b extending from a lower part of the hub 56a in a generally perpendicular relationship with each other, and two rib members 58 formed on the flange 56b.

The gear 52 includes a gear portion 68 meshed with an idler (not shown), an inner cylinder 70a coupled to an upper part of the hub 56a of the pulley 50, and an outer cylinder 70b concentrically spaced from the inner cylinder 70a. The outer cylinder 70b of the gear 52 is provided with guide grooves 72.

The clutch wheel 54 includes a ring member 60 having sliders 66 inward projected therefrom and slidably inserted into the guide grooves 72 of the outer cylinder 70b of the gear 52, an annular web 62 outward extended from a lower portion of the ring member 60, and protrusions 64 downward projected from the web 62. The engagement of the sliders 66 of the ring member 60 with the guide grooves 72 of the outer cylinder 70b can prevent the slippage between the pulley 50 and the gear 52 during the operation of the VCR. Of course, the guide grooves 72 and the sliders 66 may be formed at the ring member 60 and the outer cylinder 70b, respectively. Preferably, the flange 56b of the pulley 50 has at least three rib members 58 formed thereon, which enable the protrusions 64 of the clutch wheel 54 to speedily couple thereto with a minimal rotation of the pulley 50, minimizing the switching time of operating mode. This results in a substantial reduction of the tape slackness.

The variable torque generating means includes a cylindrical, stepped spring holder 74 having slits 76, 77 formed at an upper and a lower portions thereof, a first one-way clutch spring 78 inserted around the inner cylinder 70a of the gear 52, and a second one-way clutch spring 80 inserted around the lower part of the hub 56a. The first clutch spring 78 has a smaller diameter than that of the second clutch spring 80. One end of the first clutch spring 78 is inserted into one of the upper slits 76 of the spring holder 74. Similarly, one end of the second clutch spring 80 is inserted into one of the lower slits 77 of the spring holder 74. The biasing force of the respective clutch springs 78, 80 are actuated in an opposite relationship with each other so that a variable torque may occur during the switching of operating mode.

Figure 4:
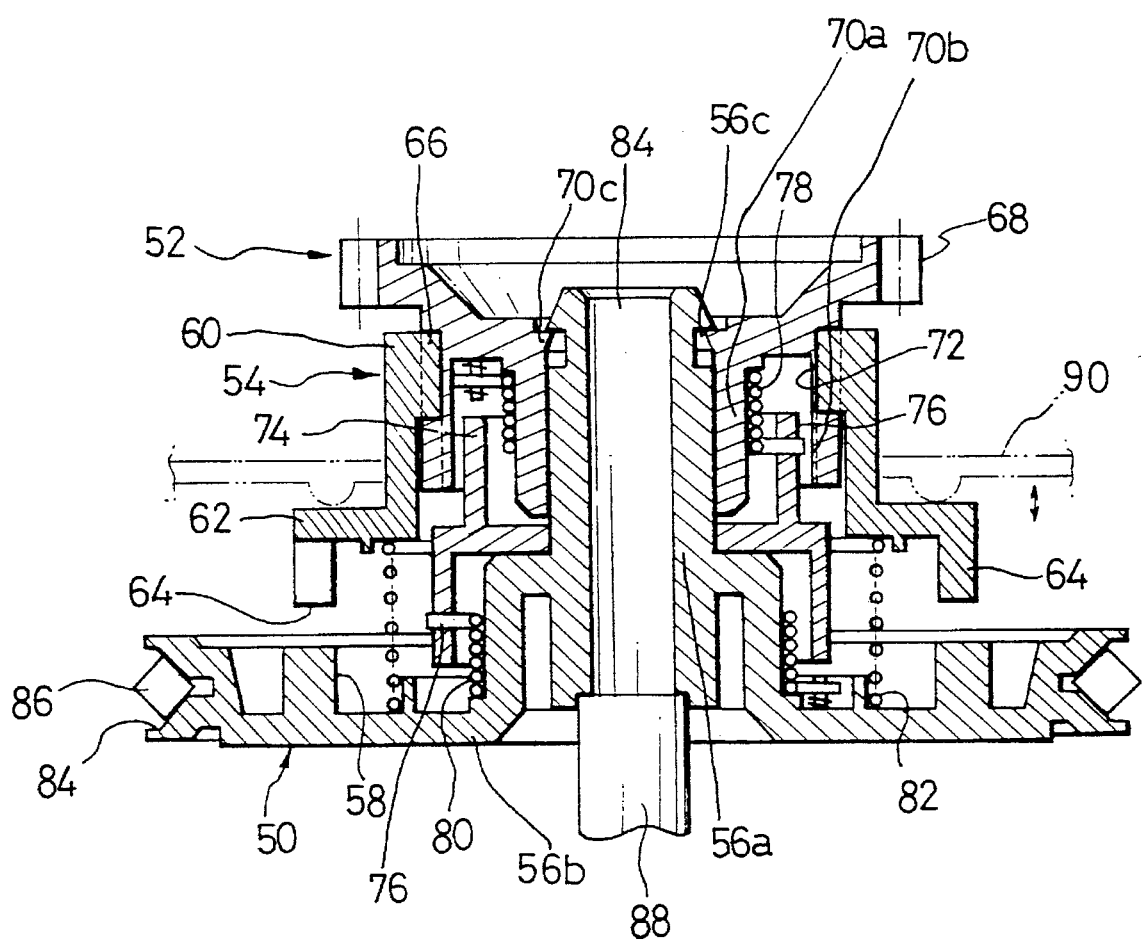
FIG. 4 depicts a schematic sectional view showing, in its assembled states, the reel disc driving device shown in FIG. 3 and taken along line A—A of FIG. 3.

As best shown in FIG. 4, the pulley 50 is provided with a V-shaped groove 84 formed at the periphery thereof, to which a belt 86 is coupled, transmitting the driving force of a capstan motor (not shown) to the gear 52 therethrough. The hub 56a of the pulley 50 is provided with an annular locking recess 56c formed at the top end thereof. The inner cylinder 70a of the gear 52 has an annular locking jaw 70c provided at an internal upper portion thereof and adapted to engage with the locking recess 56c of the hub 56a. Therefore, the gear 52 does not be separated from the hub 56a during the rotation of the pulley 50 due to the engagement of the jaw 70c with the recess 56c.

A spring 82 is arranged between the annular web 62 of the clutch wheel 54 and the flange 56b of the pulley 50 to bias upward the clutch wheel 54. The clutch wheel 54 may be associated with a pressing plate 90 which serves to exert the wheel 54 against the flange 56b of the pulley 50, providing the interlocking between the pulley 50 and the clutch wheel 54 during the selected mode operation of the VCR. That is, the engagement of the protrusions 64 of the clutch wheel 54 with the rib members 58 of the pulley 50 enables the rotating torque of the pulley 50 to directly transmit to the gear 52 through the clutch wheel 54, thereby driving the gear 52 under the greater torque.

In accordance with a preferred embodiment of the present invention, the operation of the reel disc driving device as constructed above will now be described hereinbelow. In case of the play mode operation of the VCR, e.g., with the clockwise rotation of the pulley 50, an idler ID meshed with the gear portion 68 of the gear 52 is engaged with the take-up reel disc. At this time, the first one-way clutch spring 78 will bind the inner cylinder 70a of the gear 52, whereas the second one-way clutch spring 80 will release the lower part of the hub 56a, imparting a relatively lesser torque to the gear 52. This results in the constant rotating speed of the take-up reel disc.

On the other hand, in the review mode operation of the VCR, the pulley 50 is rotated in the counterclockwise direction and, therefore, the idler is engaged with the supply reel disc. In this case, each clutch spring 78, 80 will be activated in a reverse manner. At this time, since the diameter of the second clutch spring 80 is larger than that of the first clutch spring 78, a relatively higher torque is provided to the gear 52.

Further, in the high speed operating mode, e.g., fast forward mode and rewinding mode, the clutch wheel 54 is pressed toward the pulley 50 against the biasing force of the spring 82 by the downward movement of the pressing plate 90, depending on the selection of operating mode. As a result, the protrusions 64 of the clutch wheel 54 is engaged with the ridge members 58 of the pulley 50 so that the driving force of the pulley 50 is directly transmitted to one of the reel discs through the gear 52 and the idler ID. Therefore, each reel disc can be smoothly rotated at a stronger torque, thereby operating the VCR in the fast forward and rewinding modes.

Although the invention has been shown and described with respect to the preferred embodiments, it will be understood by those skilled in the art that certain changes and modifications may be made without departing from the spirit and scope of the invention as defined in the following claims.

What is claimed is:

1. A reel disc driving device for use in a VCR, capable of operating in a variety of operating modes, having an idler for selectively transmitting the driving force of a capstan motor therethrough to one of a supply and a take-up reel discs rotatably mounted to a deck of the VCR, which comprises:

a driving pulley having a cylindrical hub rotatably mounted to a support shaft of the deck and a flange extending from a lower part of the hub in a generally perpendicular relationship with each other;

a driving gear having an inner cylinder inserted around an upper part of the hub, an outer cylinder concentrically and radially spaced from the inner cylinder, and a gear portion integrally formed at the outer cylinder and meshed with said idler;

a clutch wheel disposed between said pulley and said gear for a selective engagement with said pulley, said clutch wheel including a ring member axially slidably and nonrotatably coupled to the outer cylinder of said gear and an annular web outwardly extended from a lower portion of the ring member;

means provided on said annular web for non-rotatably engaging said pulley flange when said clutch wheel is at a downward position;

means for biasing the clutch wheel upward to disengage it from said flange; and means mounted to the hub of said pulley for variably generating a torque required for driving said gear depending on an operating mode selected, wherein said torque generating means includes a cylindrical, stepped spring holder having a plurality of slits formed at upper and lower portions thereof, a first one-way clutch spring inserted around the inner cylinder of said gear, opposite ends of said first clutch spring being fixed to one of the upper slits and to the inner cylinder of the gear, respectively, and a second one-way clutch spring inserted around the lower part of the hub which has a greater diameter than that of the inner cylinder, one end of said second clutch spring being fixed to one of the lower slits and the other end being fixed to the lower part of the hub, said second spring having a greater diameter than that of said first spring, wherein said respective clutch springs are activated in an opposite relationship with each other in a switching of operating mode, thereby allowing the first one-way clutch spring to bind the inner cylinder of the gear, while allowing the second one-way clutch spring to release the lower part of the hub and vice versa.

2. The reel disc driving device of claim 1, wherein said hub of said pulley has an annular locking recess formed on the top end thereof, and said inner cylinder of said gear has an annular locking jaw provided at an internal upper portion thereof and adapted to engage with said locking recess to retain said gear on said hub.

3. The reel disc driving device of claim 1, wherein said means for non-rotatably engaging includes a plurality of protrusions downwardly projected from the web thereof, and said pulley includes a plurality of rib members formed on the flange thereof, whereby said protrusions are engaged with said rib members in said downward position of said clutch wheel so as to directly transmit the driving force of the pulley to the gear through said clutch wheel.

4. The reel disc driving device of claim 3, wherein said gear includes guide grooves formed at the outer cylinder thereof, and said clutch wheel includes sliders provided in the ring member thereof and slidably engaged with the guide grooves of the gear.

* * * * *